United States Patent [19]

Hollis, Jr. et al.

[11] Patent Number: 5,163,844
[45] Date of Patent: Nov. 17, 1992

[54] BATTERY-FREE ELECTRONIC TEACHING APPARATUS WITH KEYPAD OF PIEZO FILM SWITCHES

[75] Inventors: Eugene E. Hollis, Jr., Plano; Richard A. Houghton, Dallas; Richard H. Wallace, Plano, all of Tex.

[73] Assignee: Texas Instruments Incorporated, Dallas, Tex.

[21] Appl. No.: 605,897

[22] Filed: Oct. 30, 1990

[51] Int. Cl.⁵ ............................................. G09B 7/00
[52] U.S. Cl. .................................... 434/327; 434/335
[58] Field of Search ............ 434/157, 236, 325, 333, 434/335, 343; 273/1 E, 856; 341/23, 34; 340/365 A

[56] References Cited

U.S. PATENT DOCUMENTS

| | | | |
|---|---|---|---|
| 4,085,523 | 4/1978 | Duncan | 434/201 |
| 4,303,398 | 12/1981 | Yoseloff | 434/335 |
| 4,636,977 | 1/1987 | Ikemoto et al. | 434/157 X |
| 4,681,548 | 7/1987 | Lemelson | 434/311 |
| 4,712,092 | 12/1987 | Boldridge et al. | 340/365 A |
| 4,857,887 | 3/1989 | Iten | 341/34 |

*Primary Examiner*—Richard J. Apley
*Assistant Examiner*—Glenn E. Richman
*Attorney, Agent, or Firm*—William E. Hiller, Richard L. Donaldson.

[57] ABSTRACT

An electronic learning device (10) uses keys (12a–e) which self-generate an electric signal responsive to a key being pressed. The electric signal is sufficient to drive a display (18) for indicating the correctness of the response. Cards (14) provide a query and a plurality of possible answers, each possible answer associated with one of the keys (12a–e). A correct answer is encoded on the card.

16 Claims, 3 Drawing Sheets

BATTERY-FREE ELECTRONIC TEACHING APPARATUS WITH KEYPAD OF PIEZO FILM SWITCHES

This application is related to U.S. patent application Ser. No. 605,909, filed Oct. 30, 1990 by Ronald A. Gaddis, entitled "Electronic Teaching Apparatus and Method", filed concurrently herewith.

TECHNICAL FIELD OF THE INVENTION

This invention relates in general to electronic circuits, and more particularly to an electronic teaching apparatus and method.

BACKGROUND OF THE INVENTION

Electronic teaching devices have greatly enhanced the learning capabilities of young children. A properly designed electronic teaching device provides excitement and visual rewards to a child and thus enhances the child's desire to learn. Further, most electronic teaching devices are portable, which allows children to use the devices in many settings.

One shortcoming of electronic teaching devices is their reliance on an electricity source. Typically, batteries are used in the electronic teaching devices. Batteries, however, eventually lose power and typically cannot be easily replaced by the child. Also, the cost of batteries over the life of the device may be substantial. Alternatively, the devices could be designed to connect to house current, but this would reduce the portability of the teaching devices and possibly endanger younger children.

Over the years, flash cards have proven to be an effective means of teaching children a variety of subjects, such as math, history and geography, among others. Conventional flash card systems, however, are electrically passive. Thus, they do not generate the enthusiasm for learning provided by electronic teaching devices. Existing electronic flash card systems provide the advantages of electronics, but require either batteries or an integral power supply plugged into the house current.

Therefore, a need has arisen for electronic teaching device which is self-powered.

SUMMARY OF THE INVENTION

In accordance with the present invention, an electronic teaching device and method is provided which eliminates the problems associated with prior such devices.

The electronic teaching device of the present invention comprises a medium for providing queries to a user. Keys are provided for receiving a response from the user and self-generating an electrical signal responsive to a key being pressed. Circuitry for indicating the correctness of the response is driven by the electrical signal.

The present invention provides the technical advantages over the prior art. Since the electrical signal is generated from the mechanical action of the key being pressed, no batteries are necessary. Thus, the electronic teaching apparatus may be used without the need of batteries or an external power source.

In one embodiment of the present invention, a plurality of cards are used to pose questions to the user, each card providing a plurality of possible answers from which the user is to select the correct answer. A plurality of piezo film switches corresponding to respective possible answers are provided. An electrical signal is generated responsive to movement of the switch by the user to indicate a selected answer. Circuitry for indicating the correctness of the selected answer is driven by the electrical signal.

This aspect of the present invention allows flash cards to be used in conjunction with an electronic device without the need for batteries or an external power source.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The preferred embodiment of the present invention and its advantages are best understood by referring to FIGS. 1-6 of the drawings, like numerals being used for like and corresponding parts of the various drawings.

Figure 1:
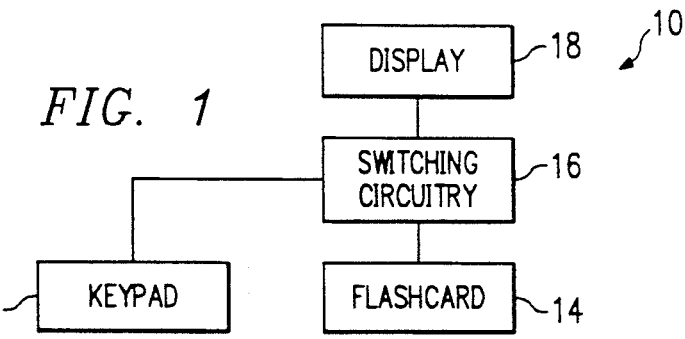
FIG. 1 illustrates block diagram of the present invention.

FIG. 1 illustrates a block diagram of the present invention. An electronic teaching device 10 is comprised of a keypad 12 and a flash card 14 both coupled to switching circuitry 16. Switching circuitry 16 is coupled to a display 18.

The keypad 12 comprises a plurality of keys. When the user presses one of the keys of the keypad 12, an electrical signal is self-generated from the pressing action without using an external power source. Suitable keys are described in greater detail in connection with FIGS. 4a-b.

Figure 2:
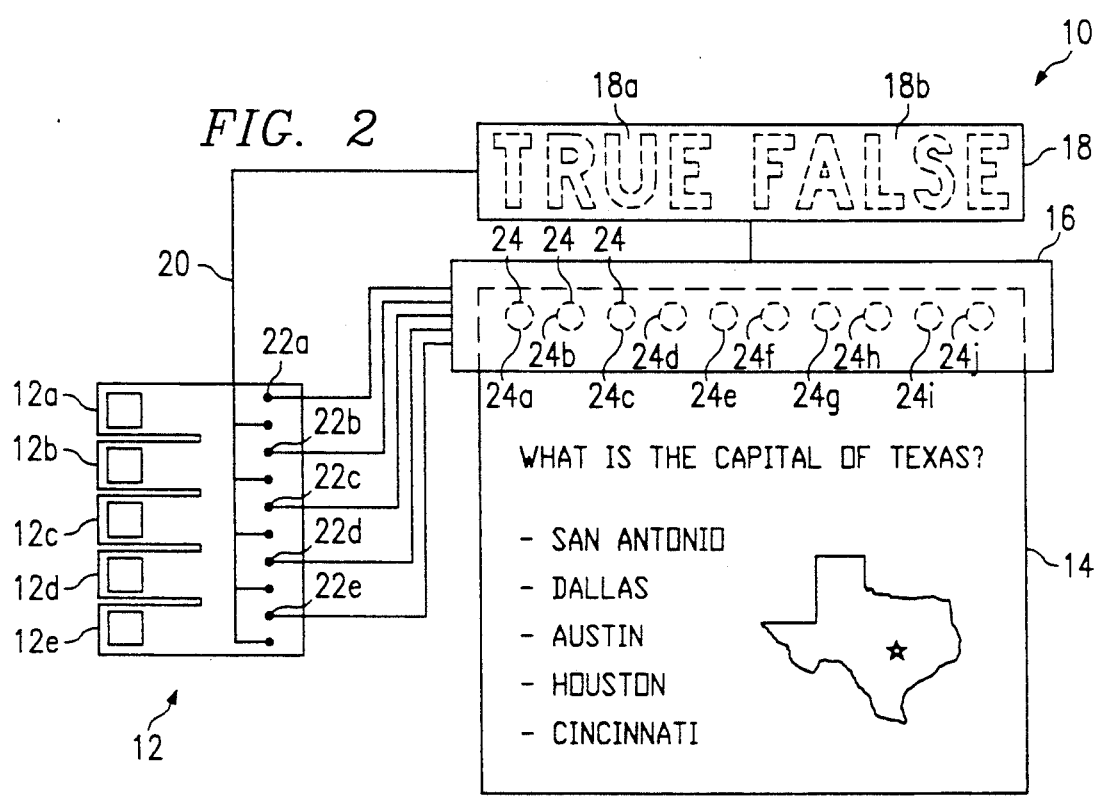
FIG. 2 illustrates a schematic diagram of the present invention.

The flash card 14, shown in greater detail in connection with FIG. 2, poses a query to the user. The correct answer is encoded on the flash card 14 such that switching circuitry 16 may determine whether the key pressed by the user indicates the correct response. The electrical signal generated by the pressed key drives a display 18, which provides a visual indication of whether the user's response corresponds to the correct answer. Hence, the display 18 will be powered contemporaneously with the pressing of one of the keys of keypad 12. Once the electrical signal from the key subsides, the display 18 will blank. In the preferred embodiment, the display 18 comprises an LCD display.

Alternative means of indicating a correct answer could also be provided, depending upon the power that can be generated by the keys. For example, the correctness of an answer could be indicated by two different tones generated responsive to the electrical signal produced by the pressed key of keypad 12. One or more lights could also be used to indicate a correct or incorrect answer.

FIG. 2 illustrates a diagram of the main parts of the educational teaching device 10. In this FIGURE, five keys 12a–e comprise the keypad 12. Each key 12a–e has two outputs, a "common" output 20, each common output being connected to the TRUE/FALSE display 18, and a "voltage" node 22a–e, respectively. The voltage nodes 22a–e are connected to the switching circuitry 16 as shown in greater detail in connection with FIG. 3. The cards 14 have the correct answer encoded in a portion of the card 14 that interfaces with the switching circuitry 16. As shown in FIG. 2, there are ten possible contact points 24a–j (generally referred to contact points 24). Pairs of contact points 24 define whether a respective key is the correct or incorrect answer.

In the example of FIG. 2, the card 14 poses a query "What is the capital of Texas?" The five possible answers are "San Antonio" assigned to key 12a, "Dallas" assigned to key 12b, "Austin" assigned to key 12c, "Houston" assigned to key 12d, and "Cincinnati" assigned to key 12e. Contact point pair 24a–b corresponds to key 12a, contact point pair 24c–d corresponds to key 12b, contact point pair 24e–f corresponds to key 12c, contact point pair 24g–h corresponds to key 12d and contact point pair 24i–j corresponds to key 12e. The first contact point in each pair designates that the corresponding key provides a correct answer. Hence, contact points 24a, 24c, 24e, 24g and 24i designate that the corresponding key 12a–e provides the correct answer. Similarly, contact points 24b, 24d, 24f, 24h and 24j designate that the corresponding key 12a–e provides an incorrect answer. Thus, for the flash card 14 shown in FIG. 2, contact point 24e would be enabled, since "Austin" is the correct answer to the query. Contact points 24b, 24d, 24h and 24j would also be enabled since the remaining answers are false. Thus, if a user pressed keys 12a, 12b, 12d or 12e, a "FALSE" would be shown on the display 18. If key 12c was pressed by the user, "TRUE" would be shown on the display 18.

Figure 3:
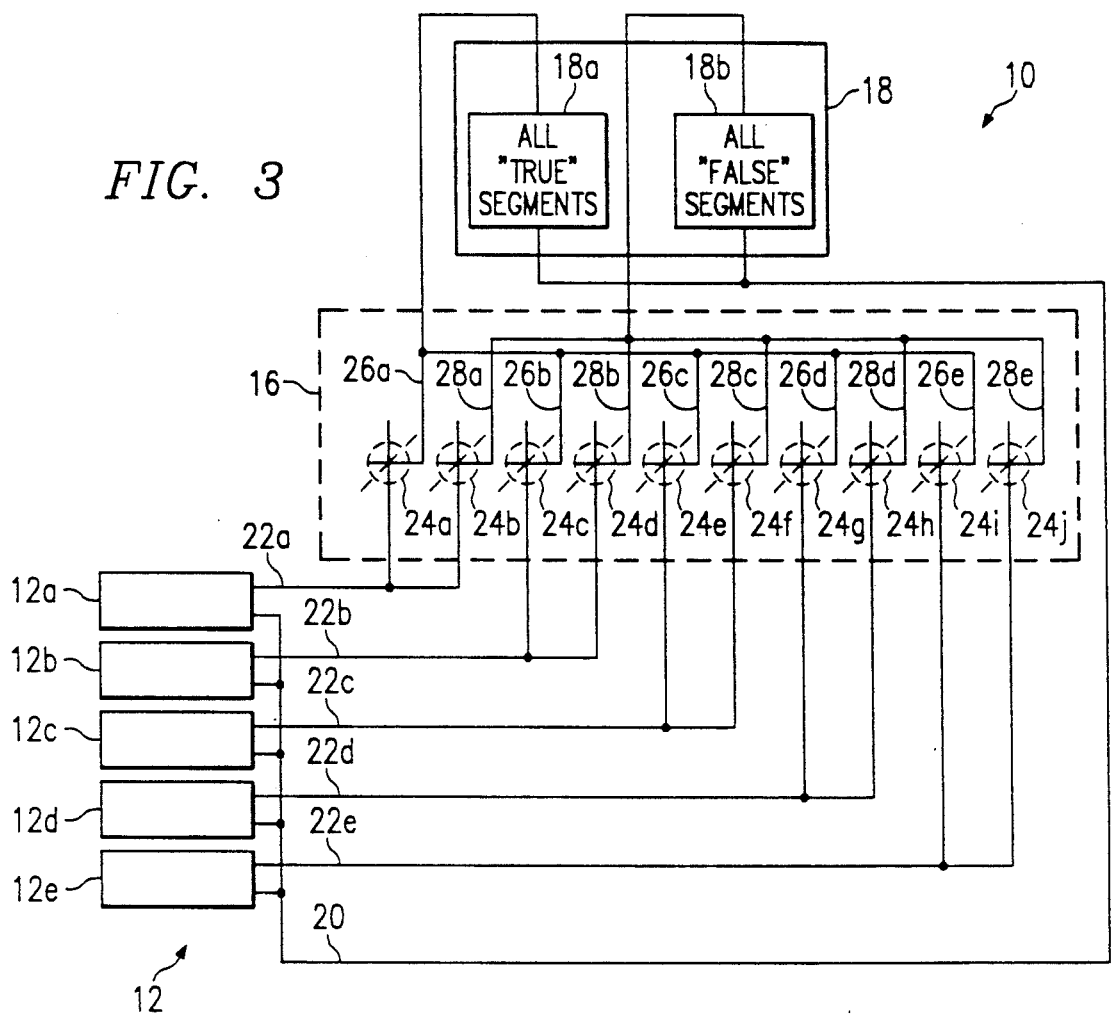
FIG. 3 illustrates a schematic diagram of the switch circuitry of the present invention.

FIG. 3 illustrates the connections between the keypad 12 and the display 18 in greater detail. The TRUE segments 18a of the display 18 are connected between the common nodes 20 and leads 26a–e. The FALSE segments 18b of the display 18 are connected between the common nodes 20 and leads 28a–e.

When a contact point 24a–j on the card 14 is enabled, the respective lead 26a–e or 28a–e is electrically coupled to the voltage node 22a–e of the respective keys 12a–e. Hence, if contact point 24a were enabled, then lead 26a would be electrically coupled to node 22a. If contact point 24b were enabled, lead 28a would be coupled to node 22a. Using the example illustrated in FIG. 2, nodes 24b, 24d, 24e, 24h and 24j would be enabled. Hence, by pressing key 12a, node 22a would be coupled to lead 28a, thereby causing a voltage to be generated on he FALSE segments 18b. Node 22b would be coupled to lead 28b, thereby resulting in a voltage on the FALSE segments 18b when key 12b was pressed. Key 12c would be coupled to lead 26c, thereby causing a voltage on the TRUE segments 18a when key 12c was pressed.

Figure 4A:
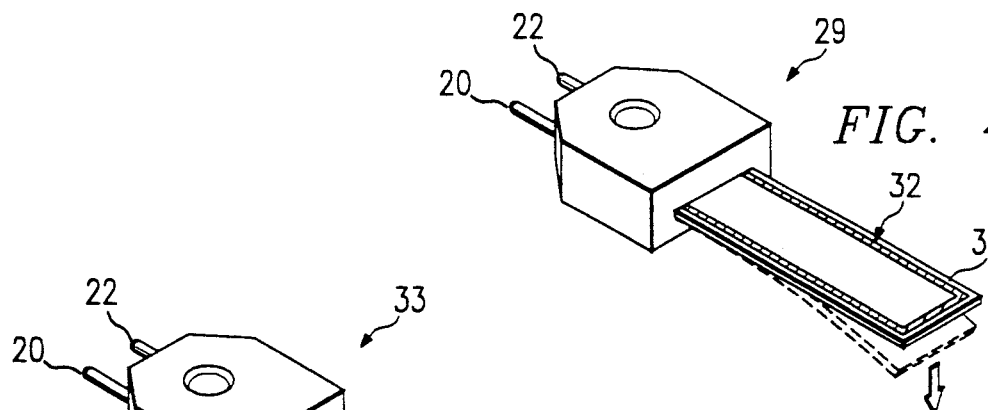
FIGS. 4a-b illustrate perspective views of flexure and snap-action piezo-film switches.
Figure 4B:
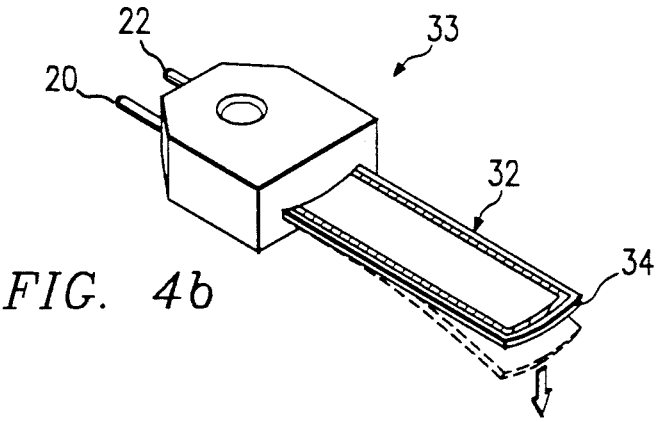

FIGS. 4a–b illustrate two embodiments of keys of keypad 12 used in the invention to generate a voltage when the keys are pressed. FIG. 4a illustrates a piezo film flexure switch 29. The switch comprises a planar base 30, typically comprised of spring steel, and a rectangular piece of metallized piezo film 32 adhered to the base 30. The piezo film 32 typically comprises a polarized homopolymer of vinylidene fluoride (PVDF). This material (and complete switches) may be purchased from the Atochem Corporation (previously Pennwalt Corporation) of Valley Forge, Pa. A piezo electric material produces an electrical charge when deformed, and similarly, a voltage applied to the piezo electric material causes the material to elongate or contract, depending on the field's polarity. Hence, by pressing the switch 29, the base 30 is elongated, thereby stretching the piezo material 32. The deformation of the piezo material 32 results in a voltage generated across the output nodes 20 and 22. The output of the flexure switch 29 shown in FIG. 4a depends upon the rate of base 30 elongation. Thus, a slow pressing of the key 12 may result in a very low voltage output, which may be insufficient to drive the display 18. The power output of the switch 29 may also be varied by varying the amount of material 32.

FIG. 4b illustrates a snap-action switch 33. In this embodiment, the switch has a curved or creased base 34. When the switch 33 is pressed, the base 34 resists deformation until it can not long withstand the pressing force. At this threshold level, the base 34 "clicks." By varying the threshold of the base 34, a desired voltage may be produced which is optimal for driving the display 18.

Figure 5:
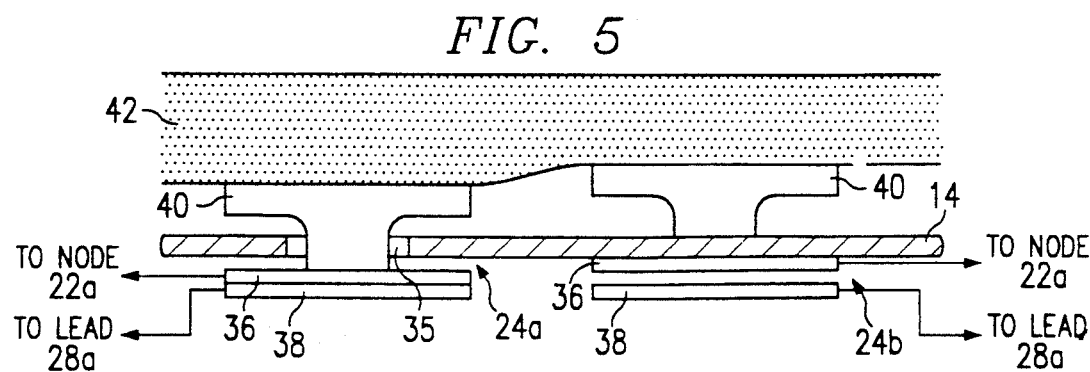
FIG. 5 illustrates a cross-sectional side view depicting the interaction between the flash card and the switch circuitry.

FIG. 5 illustrates an embodiment of the invention for connecting the voltage nodes 22a–e of the switches 12a–e to the display 18. In this embodiment, the contact points are enabled by forming a hole 35 through the card 14. Where a hole is formed, the contact point is enabled; where a hole 35 is not formed, the contact point is not enabled. Hence, in FIG. 5, contact point 24a is enabled while contact point 24b is not enabled. Upper contacts 36 are connected to respective nodes 22a–e. Thus, the upper contacts 36 corresponding to contact points 24a–b are connected to node 22a, the upper contacts 36 corresponding to contact points 24c–d are connected to node 22b, and so on. Lower contacts 38 are connected to respective leads 26a–e and 28a–e. The lower contact 38 corresponding to contact point 24a is connected to lead 26a, the lower contact 38 corresponding to contact point 24b is connected to lead 28a, the lower contact 38 corresponding to contact point 24c is connected to lead 26b, and so on. The upper and lower contacts 36 and 38 are normally spaced apart, such that an open circuit exists. When a card is inserted into the electronic teaching device 10, plugs 40 are pressed against the contact points 24a–j. Where a contact point 24 is enabled (i.e., a hole 35 is formed) the plug 40 pushes through the hole 35 and forces the contacts 36 and 38 together causing an electrical connection between the associated lead and voltage node. Where the contact point is not enabled, the plug 40 compresses against the card 14, and the contacts 36 and 38 remain apart. A compressible foam material 42 may be used to provide additional spring to the plugs 40.

While the embodiment shown in FIG. 5 is one method of providing contact between the leads 26a–e and 28a–e and the voltage nodes 22a–e, other methods could be used to selectively connect the voltage nodes to respective leads. For example, metal discs could be placed on the bottom of the cards 14 which would provide a bridge between the nodes and the leads.

Further, while the cards 14 are shown a providing a single question with a single encoded answer, multiple questions with multiple encoded answers could be provided. In one embodiment, questions could be provided on both sides of the cards. The encoded answer could be on opposite edges of the cards or using a single edge. In the single edge version, answers would be arranged such that the contact points provided the correct answer for each side of the card.

Figure 6:
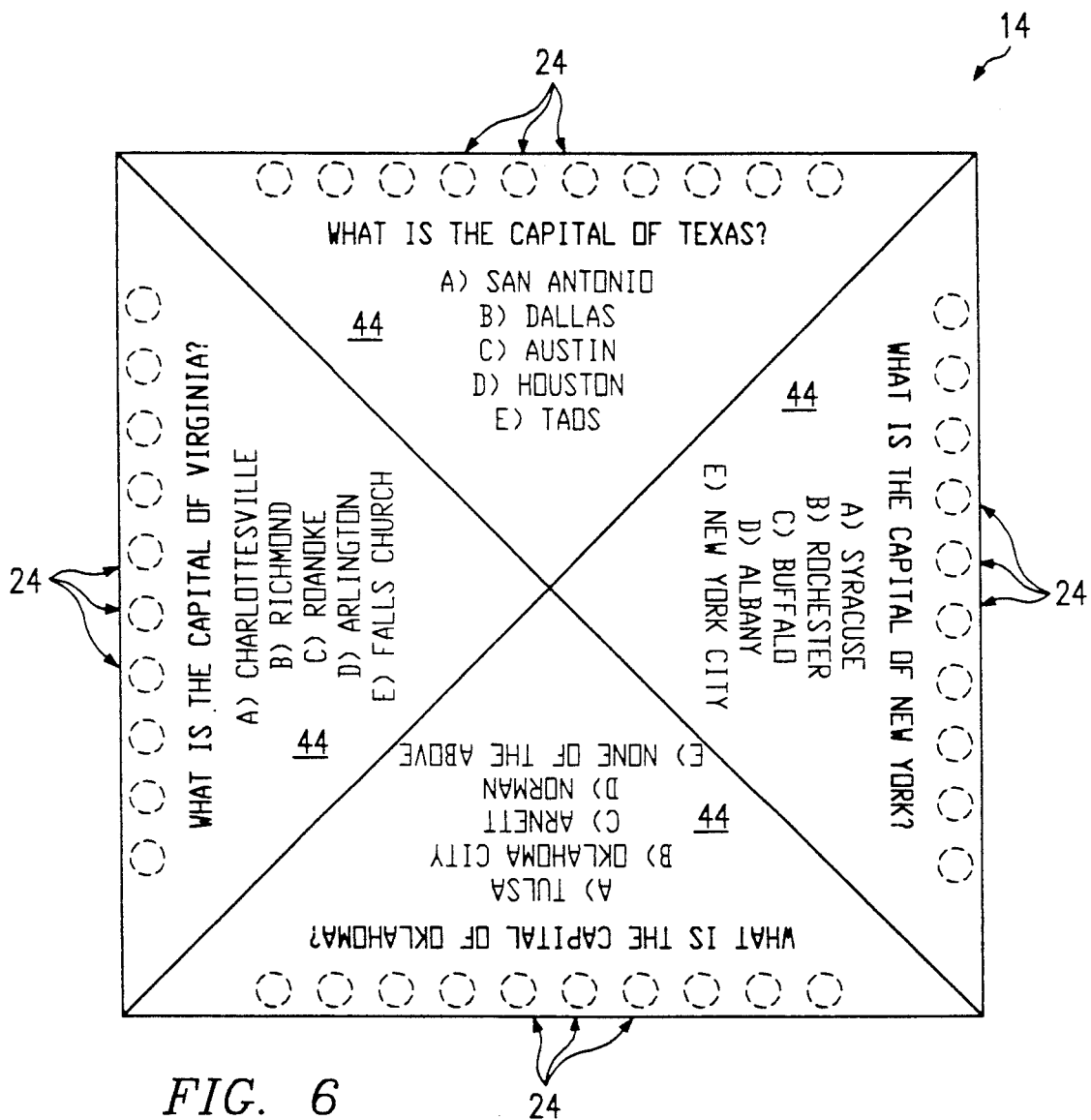
FIG. 6 illustrates a multizone card operable for use in the present invention.

Additional questions could be provided by dividing each face of the card into two or more zones. Two zones could be provided by "top" an "bottom" zones. Four zones could be provided by sectioning the card into four triangular zones 44, each triangle having a card edge as one of its bases, as shown in FIG. 6. Additional zones could be created by providing multisided cards, such as hexagonal cards.

The present invention provides significant advantages over the prior art. First, the present invention provides a self-powered teaching device with simplified circuitry to drive the display. Second, a dependable circuit is provided for receiving the card and decoding the correct answer therefrom.

Although the present invention and its advantages have been described in detail, it should be understood that various changes, substitutions and alterations can be made herein without departing from the spirit and scope of the invention as defined by the appended claims.

What is claimed is:

1. A portable, battery-free electronic teaching apparatus comprising:
   a medium for posing one of a question and a problem to a user for which a user response in the form of an answer is desired;
   a keypad including a plurality of keys for receiving a response to said one of a question and a problem from the user as determined by the selective actuation by the user of at least one key of said plurality of keys;
   each of said keys being structured to provide self-generation of an electrical signal therefrom independent of a separate power source in response to selective actuation by the user; and
   means operably associated with said keypad and responsive to the key-generated electrical signal resulting from the selective actuation of a particular key by the user for indicating the correctness of the response by the user, as determined by the selective actuation of the particular key by the user, to said one of a question and a problem as posed by said medium.

2. An electronic teaching apparatus as set forth in claim 1, wherein said plurality of keys of said keypad comprise a plurality of piezo film switches.

3. An electronic teaching apparatus as set forth in claim 1, wherein said plurality of piezo film switches comprises a plurality of piezo film flexure switches.

4. An electronic teaching apparatus as set forth in claim 1, wherein said plurality of piezo film switches comprises a plurality of piezo film snap-action switches.

5. An electronic teaching apparatus as set forth in claim 1, wherein said means for indicating the correctness of the response by the user comprises a display.

6. An electronic teaching apparatus as set forth in claim 5, wherein said display comprises a liquid crystal display.

7. An electronic teaching apparatus as set forth in claim 1, wherein said medium comprises a plurality of cards, each card posing one of a question and a problem to a user and a plurality of possible answers to said one of a question and a problem.

8. An electronic teaching apparatus as set forth in claim 7, wherein each of said cards has a machine readable code indicating the correct answer encoded thereon;
   only one of said plurality of keys of said keypad being operably associated with said machine readable code indicating the correct answer on said card;
   the selective actuation of said only one key by the user as a user response in the form of an answer being transmitted to said means for indicating the correctness of the response by the user; and
   said means for indicating the correctness of the response by the user being responsive to the selective actuation of said only one key by the user to indicate that the answer represented thereby is correct.

9. A portable, battery-free electronic teaching apparatus comprising:
   a medium for posing one of a question and a problem to a user for which a user response in the form of an answer is desired;
   a keypad including a plurality of keys for receiving a response to said one of a question and a problem from the user as determined by the selective actuation by the user of at least one key of said plurality of keys;
   each of said keys structured to provide self-generation of an electrical signal therefrom independent of a separate power source in relation to selective actuation by the user; and
   means operably associated with said keypad and responsive to the key-generated electrical signal resulting from the selective actuation of a particular key by the user for indicating the correctness of the response by the user, as determined by the selective actuation of the particular key by the user, to said one of a question and a problem as posed by said medium;
   said means for indicating the correctness of the response by the user comprising a display;
   each of said plurality of keys having at least one key output conductor different from the key output conductors of the other keys to provide a plurality of key output conductors corresponding to the plurality of keys;
   first and second contact points respectively corresponding to each of said keys;
   each of said key output conductors including a pair of terminal end portions in engagement with said first and second contact points corresponding to the same key;
   each of the first contact points corresponding to each of said keys designating that the corresponding key provides a correct answer;
   each of the second contact points corresponding to each of said keys designating that the corresponding key provides an incorrect answer;
   said medium comprising a plurality of cards, each of said cards posing one of a question and a problem to a user and a plurality of possible answers to said one of a question and a problem; and
   a machine readable code provided on each of said plurality of cards and defined by the selective enablement of one of said first contact points corresponding to one of said plurality of keys and the enablement of each of said second contact points for the remaining ones of said plurality of keys;
   the selective actuation of a key by the user as a response generating an electrical signal transmitted by said key output conductor to said first and second contact points via said pair of terminal end portions thereof and producing a correct answer by said display when said first contact point is enabled and said second contact point is not enabled and an incorrect answer when said first contact point is not enabled and said second contact point is enabled.

10. An electronic teaching apparatus as set forth in claim 9, further including a card-receiving housing having a plurality of projection plugs disposed internally therein;
   each of said cards of said plurality of cards being provided with a plurality of holes therethrough;
   each of said key output conductors having contact members on said pair of terminal end portions thereof;
   a set of first and second input conductors respectively corresponding to each of said plurality of keys and being connected to said display;
   each of the sets of said first and second input conductors having contact members thereon in registration with the contact members on said pair of terminal end portions of each of said key output conductors; and
   the plurality of holes provided in each card being in selective registration with contact members of said key output conductors and said input conductors;
   respective projection plugs of said housing being selectively received within holes provided in a card to press the registering contact members into engagement with each other in response to the insertion of said card within said housing for enabling contact members in registration with a hole, other registering contact members remaining in spaced relation with respect to each other and being non-enabled.

11. An electronic teaching apparatus as set forth in claim 1, wherein said medium comprises a plurality of cards, each of said cards having two faces, and each face of said card posing one of a question and a problem to the user and a plurality of possible answers to said one of a question and a problem.

12. An electronic teaching apparatus as set forth in claim 1, wherein said medium comprises a plurality of cards, each of said cards having a plurality of zones provided thereon, and each of said zones posing one of a question and a problem to the user and a plurality of possible answers to said one of a question and a problem.

13. A battery-free electronic flash card device comprising:
   a plurality of cards having indicia provided thereon, the indicia on each card posing one of a question and a problem and providing a plurality of possible answers from which the user is to select the correct answer, the said one of a question and a problem and said plurality of possible answers provided by the indicia appearing on each card differing from that on the other cards;
   a plurality of piezo film switches normally disposed in open position and respectively corresponding to each of the plurality of possible answers provided by the indicia appearing on each card;
   each of said plurality of piezo film switches being selectively operable so as to be disposed in closed position for providing a self-generated electrical signal therefrom independent of a separate power source in response to the selective actuation thereof by the user designating an answer from the user; and
   circuitry operably associated with each of said plurality of piezo film switches and a particular card of said plurality of cards on which the user is being tested and responsive to the switch-generated electrical signal resulting from the selective actuation of a particular switch by the user disposing the switch in closed position for indicating the correctness of the designated answer from the user to said one of a question and a problem as provided by the indicia appearing on said particular card.

14. A battery-free electronic flash card device comprising:
   a plurality of cards having indicia provided thereon, the indicia on each card posing one of a question and problem and providing a plurality of possible answers from which the user is to select the correct answer, the said one of a question and a problem and said plurality of possible answers provided by the indicia appearing on each card different from that on the other cards;
   a plurality of piezo film switches normally disposed in open position and respectively corresponding to each of the plurality of possible answers provided by the indicia appearing on each card;
   each of said plurality of piezo film switches being selectively operable so as to be disposed in closed position for providing a self-generated electrical signal therefrom independent of a separate power source in response to the selective actuation thereof by the user designating an answer from the user; and
   circuitry operably associated with each of said plurality of piezo film switches and a particular card of said plurality of cards on which the user is being tested and responsive to the switch-generated electrical signal resulting from the selective actuation of a particular switch by the user disposing the switch in closed position for indicating the correctness of the designated answer from the user to said one of a question and a problem as provided by the indicia appearing on said particular card;
   said circuitry for indicating the correctness of the designated answer from the user including a display;
   each of said piezo film switches having an output conductor connected to the output thereof and different from the output conductors of the other piezo film switches to provide a plurality of output conductors corresponding to said plurality of piezo film switches;
   first and second contact points respectively corresponding to each of said piezo film switches;
   each of said output conductors including a pair of terminal end portions in engagement with said first and second contact points corresponding to the same piezo film switch;
   each of the first contact points corresponding to each of said piezo film switches designating that the corresponding piezo film switch provides a correct answer when actuated;
   each of the second contact points corresponding to each of said piezo film switches designating that the corresponding piezo film switch provides an incorrect answer when actuated; and a machine readable code being defined on each card of said plurality of cards by the selective enablement of one of said first contact points corresponding to one of said plurality of piezo film switches and the enablement of each of said second contact points for the remaining ones of said piezo film switches;

the selective actuation of a piezo film switch by the user as a response generating an electrical signal transmitted by said output conductor therefor to said first and second contact points via said pair of terminal end portions thereof and producing a correct answer by said display when said first contact point is enabled and said second contact point is not enabled and an incorrect answer when said first contact point is not enabled and said second contact point is enabled.

15. An electronic flash card device as set forth in claim 14, further including a card-receiving housing having a plurality of rejection plugs disposed internally therein;

each of said cards of said plurality of cards being provided with a plurality of holes therethrough;

each of said key output conductors having contact members on said pair of terminal end portions thereof;

a set of first and second input conductors respectively corresponding to each of said plurality of piezo film switches and being connected to said display;

each of the sets of said first and second input conductors having contact members thereon in registration with the contact members on said pair of terminal end portions of each of said output conductors; and the plurality of holes provided in each card being in selective registration with contact members of said output conductors and said input conductors;

respective projection plugs of said housing being received within holes provided in a card to press the registering contact members into engagement in response to the insertion of said card within said housing for enabling respective sets of registering contact members in registration with a hole, other sets of registering contact members remaining in spaced relation with respect to each other and being non-enabled.

16. A battery-free electronic flash card device comprising:

a plurality of cards having indicia provided thereon, the indicia on each card posing one of a question and a problem and providing a plurality of possible answers from which the user is to select the correct answer, the said one of a question and a problem and said plurality of possible answers provided by the indicia appearing on each card differing from that on the other cards;

a plurality of piezo film switches normally disposed in open position and respectively corresponding to each of the plurality of possible answers provided by the indicia appearing on each card;

each of said plurality of piezo film switches being selectively operable so as to be disposed in closed position for providing a self-generated electrical signal therefrom independent of a separate power source in response to the selective actuation thereof by the user designating an answer from the user; and circuitry operably associated with each of said plurality of piezo film switches and a particular card of said plurality of cards on which the user is being tested and responsive to the switch-generated electrical signal resulting from the selective actuation of a particular switch by the user disposing the switch in closed position for indicating the correctness of the designated answer from the user to said one of a question and a problem as provided by the indicia appearing on said particular card;

said circuitry for indicating the correctness of the designated answer comprising a display having first and second display segment groups respectively indicating a correct response and an incorrect response; and circuitry for coupling each of said plurality of piezo film switches to said first and second display segment groups in a selectively enabled arrangement such that only one of said plurality of piezo film switches is connected to said first display segment group indicating a correct response in an enabling condition for each card of said plurality of cards and the remaining ones of said plurality of piezo film switches are connected to said second display segment group indicating an incorrect response in an enabling condition for the same card;

the selective actuation of a particular piezo film switch by the user disposing the switch in closed position and producing the electrical signal transmitted to the one of said first and second display segment groups in an enabling condition for the respective card.

* * * * *